Dec. 22, 1964    J. H. MONTGOMERY    3,162,600
PORTABLE AGGREGATE SCREENING AND TRANSPORTING APPARATUS
Filed June 4, 1962    4 Sheets-Sheet 1
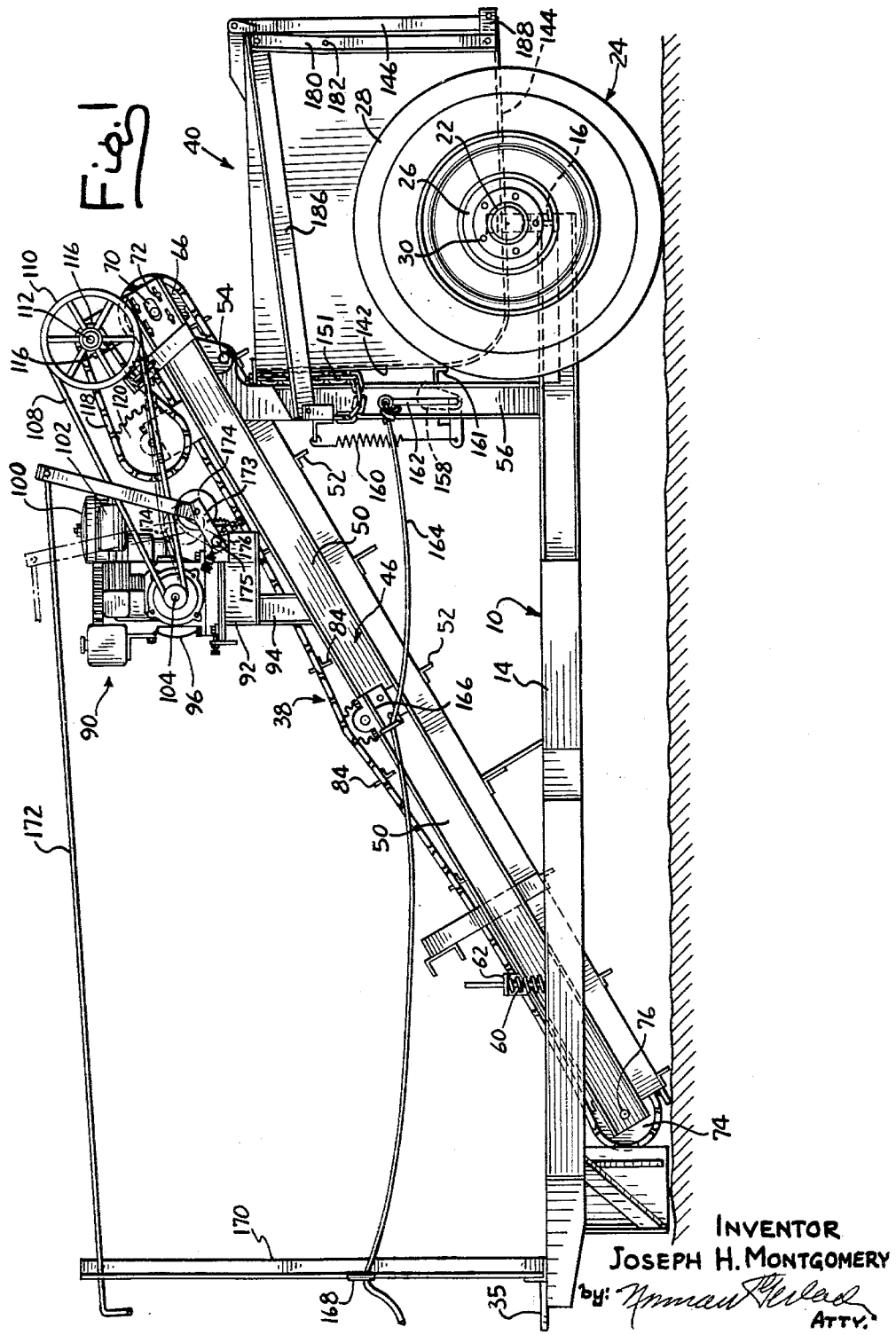
INVENTOR
JOSEPH H. MONTGOMERY

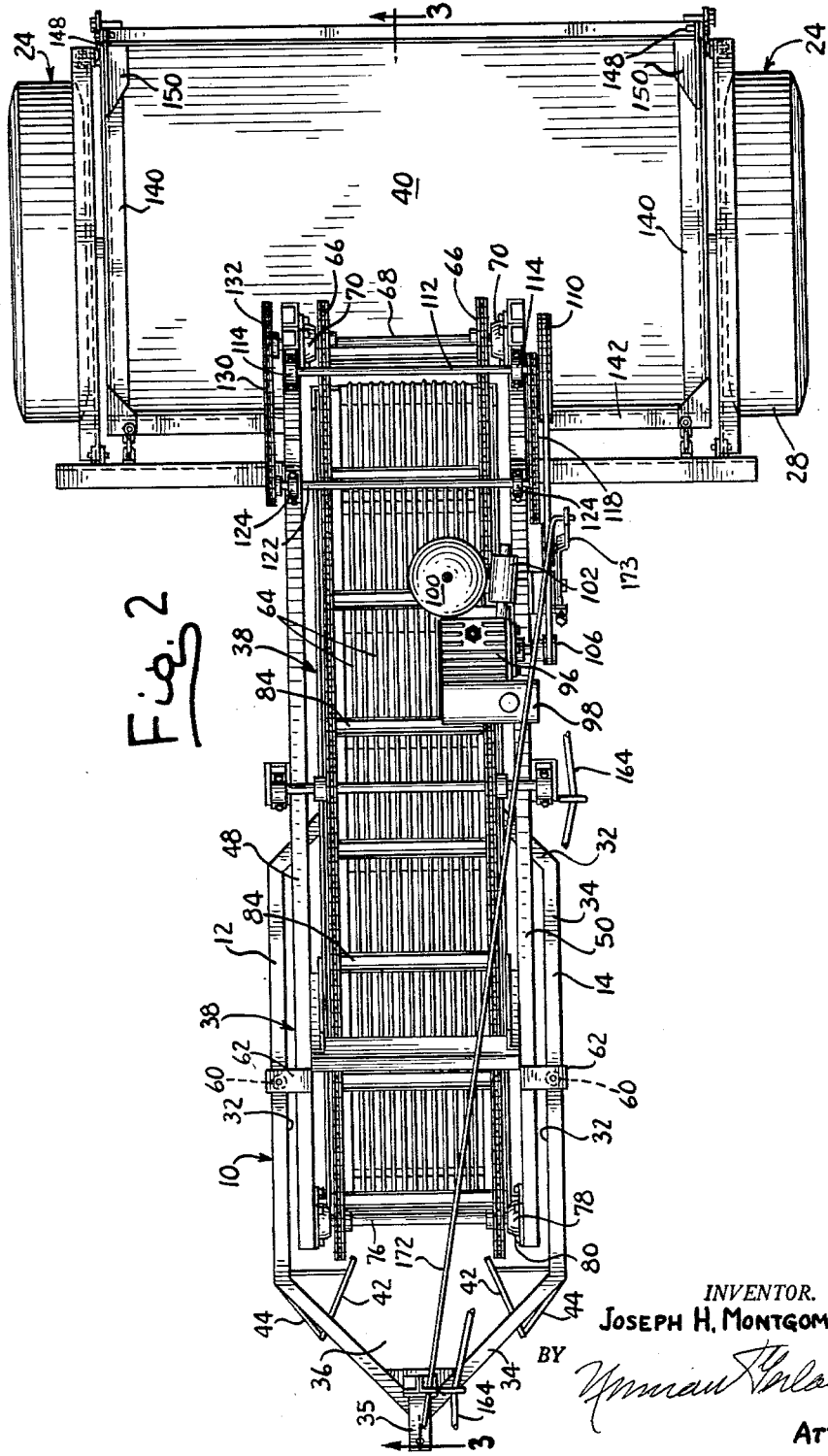

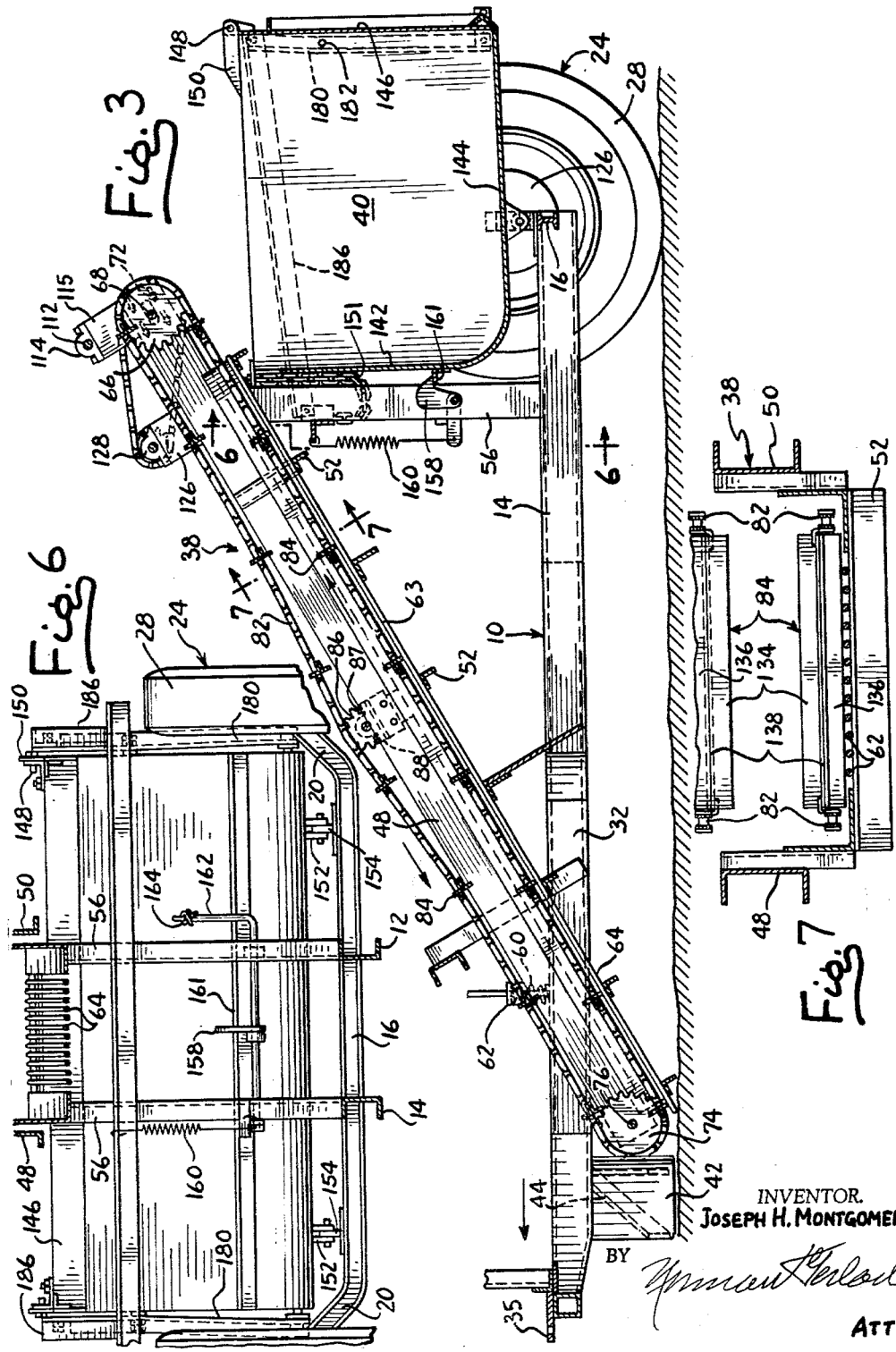

Dec. 22, 1964    J. H. MONTGOMERY    3,162,600
PORTABLE AGGREGATE SCREENING AND TRANSPORTING APPARATUS
Filed June 4, 1962    4 Sheets-Sheet 4
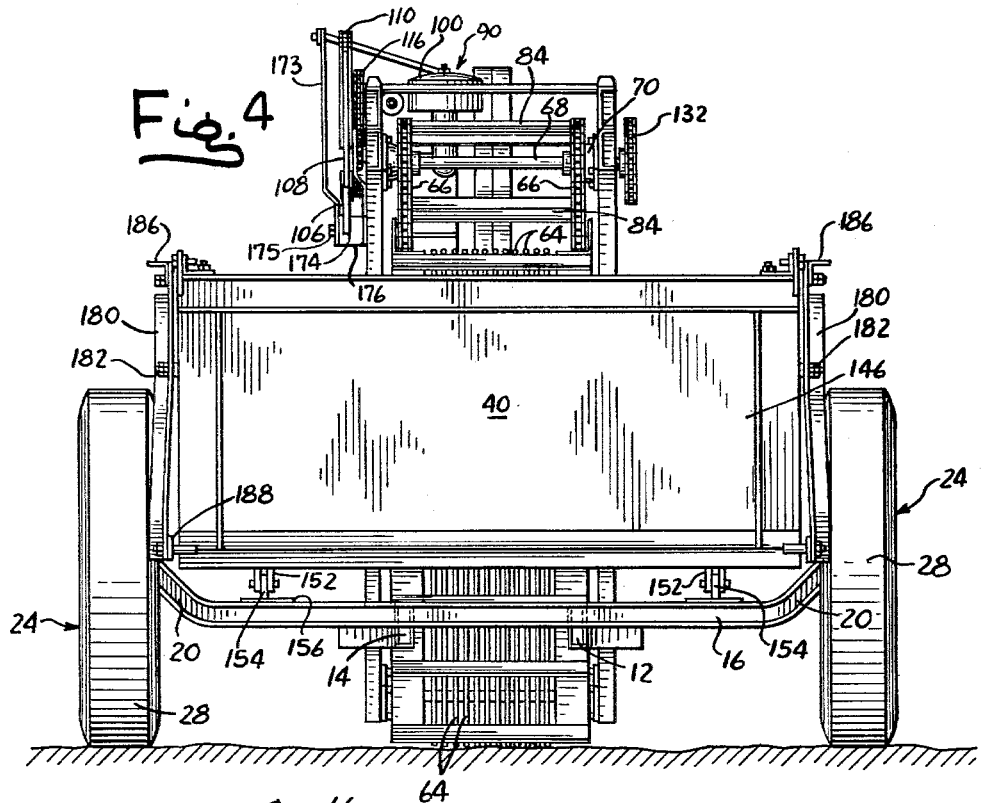
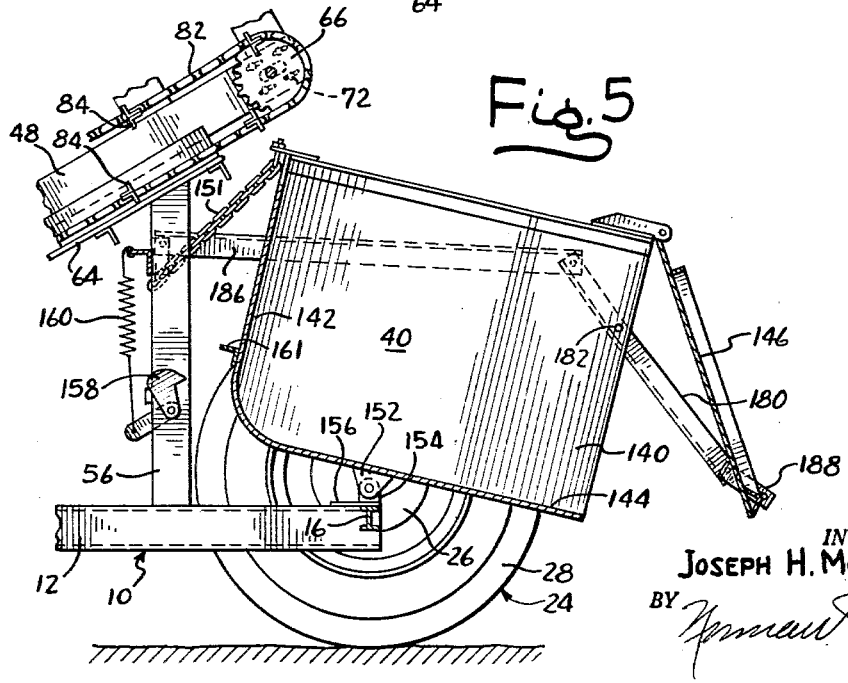
INVENTOR.
JOSEPH H. MONTGOMERY
BY
ATTY.

United States Patent Office 3,162,600
Patented Dec. 22, 1964

3,162,600
PORTABLE AGGREGATE SCREENING AND
TRANSPORTING APPARATUS
Joseph H. Montgomery, 1614 Business Loop 70, E.,
Columbia, Mo.
Filed June 4, 1962, Ser. No. 199,974
2 Claims. (Cl. 209—259)

The present invention relates to a portable aggregate screening and transporting apparatus, and has particular reference to a tractor-drawn vehicular conveyor which is designed specifically for use in connection with surfacing operations wherein loose rock or other aggregate is automatically loaded onto the conveyor and screened as to size, the smaller sized aggregate being returned to the ground and, in a manner, distributed thereon, and the larger sized aggregate being conveyed to a region of discharge and deposited at such region. A portable aggregate screening and transporting apparatus constructed according to the principles of the present invention is capable of a wide variety of uses as, for example, in the surfacing of roads, landing fields for aircraft and other rough tracts of land, or in the collection and removal of rubble in land reclamation projects. Irrespective, however, of the particular use to which the invention may be put, the essential features thereof are at all time preserved.

Briefly, the invention contemplates the provision of a tractor-drawn vehicular trailer type apparatus embodying a frame or chassis on which there is operatively mounted an endless chain conveyor having a reach section which is coextensive with an inclined screening ramp. The lower forward end of the screening ramp is designed to traverse the surface of the ground undergoing surfacing in such a manner that, as the vehicle travels forwardly under the pulling influence of the tractor, the screening ramp operates as a scoop to pick up loose aggregate while, at the same time, the endless conveyor impels the material upwardly along the ramp, suitable conveyor flights being provided for this purpose. As the material travels upwardly along the ramp, particles of aggregate which are of less than a predetermined size will pass through the screening ramp and fall to the ground, while larger particles of aggregate will continue upwardly along the ramp and be carried over the upper rear end thereof where they will fall by gravity into a tiltable hopper or dump receptacle. At such time as the dump receptacle has become fully loaded, the operator may discontinue the operation of the conveyor and transport the apparatus to a region of discharge where, by remote control from his position on the tractor, he may effect tilting and consequent discharge or dumping of the contents of the receptacle.

The provision of a vehicular trailer type apparatus of the character briefly outlined above being among the principal objects of the invention, a further object is to provide a novel arrangement of the receptacle and the conveyor whereby the same may cooperate with each other in an efficient manner, the receptacle and conveyor being individually operable under the control of the operator while seated on the tractor.

Another object of the invention is to provide such an apparatus wherein the dump receptacle is provided with an automatically operable gate structure of novel design, the gate structure moving to its open position as the receptacle is tilted for dumping purposes, and becoming automatically restored to a closed position as the receptacle returns to its normal loading position.

The provision of a vehicular trailer type apparatus which is expressly designed for handling and screening aggregate, is comprised of commercially available metal stock, and may be manufactured at a low cost; one which is simple in its construction and is possessed of a minimum number of relatively moving parts so that it is unlikely to get out of order; one which is rugged and durable and, therefore, will withstand rough usage; one which is capable of being easily assembled and dismantled for purposes of inspection, replacement or repair of parts; one which handles easily in use; and one which, otherwise, is well adapted to perform the services required of it, are further desirable features which have been borne in mind in the production and development of the present invention.

Other objects and advantages of the invention, not at this time enumerated, will become more readily apparent as the nature of the invention is being understood.

In the accompanying four sheets of drawings forming a part of this specification, one illustrative embodiment of the invention has been shown.

In these drawings:

FIG. 1 is a side elevational view of a tractor drawn vehicular trailer type screening and transporting apparatus embodying the principles of the present invention;

FIG. 2 is a top plan view of the apparatus;

FIG. 3 is a sectional view taken on the line 3—3 of FIG. 1;

FIG. 4 is a rear end elevational view of the apparatus;

FIG. 5 is a fragmentry sectional view similar to a portion of FIG. 3 and illustrating the operation of the unloading or dumping mechanism which is employed in connection with the invention;

FIG. 6 is a sectional view taken on the line 6—6 of FIG. 3; and

FIG. 7 is a sectional view taken on the line 7—7 of FIG. 3.

Referring now to the drawings in detail, and in particular to FIGS. 1 to 3, inclusive, it will be apparent that the features of the invention are embodied in a vehicular trailer type apparatus which is adapted to be towed or hauled from place-to-place by a tractor or the like. To this end, the apparatus embodies a chassis or frame 10, including spaced apart, longitudinal extending side members 12 and 14, the rear ends of which are connected together by a crossbar 16. The latter is in the form of an I-beam and serves as an axletree. As best seen in FIG. 4, the opposite end regions of crossbar 16 are turned upwardly as at 20 and serve to support thereon a pair of fixed axle spindles 22 (see FIG. 1). The spindles 22 have rotatably mounted thereon the wheels 24 which serve tractionally to support the rear end regions of the apparatus as a whole. The wheels 24 are conventional and embody hubs 26, pneumatic tires 28 and wheel mountings 30. In the rear regions of the apparatus, the frame side members 12 and 14 are parallel and assume positions which are relatively close to each other. These side members 12 and 14 are bowed outwardly in obtuse angle fashion in the forward region of the apparatus as indicated at 32, and the forward end portions of the side members converge as at 34 and are connected together by a conventional trailer hitch assembly 35 by means of which the apparatus as a whole may be attached to a tractor or the like (not shown). The outwardly bowed region of the chassis 10 thus provides a central forward clearance opening 36 (see FIG. 2) into which the lower forward end region of an elongated inclined power driven endless drag type conveyor assembly 38 projects. The nature and function of the conveyor assembly 38 will be set forth in detail subsequently and, for the present, it is deemed sufficient to state that this assembly functions somewhat in the manner of a scoop to pick up at its forward end debris, rubble, stones, rocks, dirt or whatever material is undergoing handling by the apparatus, and to convey the same upwardly and rearwardly while, at the same time, separating particles or objects of a predetermined minimum size from the total aggregate being handled and returning such small sized particles to the ground, while carrying the larger sized particles upwardly beyond the rear upper end of the conveyor assembly and discharging the same by gravity into a tiltable, open box-like dump receptacle 40 at the rear end of the apparatus and underlying the elevated rear end of the conveyor assembly. The details of the dump receptacle 40 will also be set forth in detail hereafter.

The forward end region of the chassis frame 10, where the same converges as at 34, is provided with a pair of depending supporting legs in the form of plates 42 which are welded or otherwise secured to the side members 12 and 14 and are reinforced by means of inclined struts 44. These plates serve a dual function in that they serve as legs for supporting the front end of the apparatus when the same is not in use, and also serve, when the trailer is in operation, to channel the material encountered by the trailer inwardly toward the center thereof so that it may more readily be picked up by the conveyor assembly 38 as will be explained in detail subsequently.

The conveyor assembly 38 involves in its general organization a generally rectangular conveyor frame 46. The latter includes side channels 48 and 50 which are connected together by a series of longitudinally spaced crossbars 52. The upper rear end of the conveyor frame 46 is pivoted as at 54 (see FIG. 1) to the upper end of a pair of vertically extending supports 56 which extend upwardly from the side members 12 and 14. The forward end region of the frame 46 is yieldingly supported by springs 60 (see FIGS. 1 and 3), the lower ends of which bear against the chassis frame 10 and the upper ends of which bear upwardly against brackets 62 which are carried by the conveyor frame side channels 48 and 50. When the apparatus is not in use and the leg-forming plates 42 rest upon the ground, the lower forward end of the conveyor frame 46 also rests upon the ground. However, when the hitch assembly 35 is connected to a tractor, the forward end of the conveyor frame 46 rests lightly on the ground in the manner of a scoop so that, as the vehicular trailer type apparatus moves forwardly, the material undergoing lifting will be moved onto the conveyor assembly for subsequent hoisting and size gradation, as will be explained hereafter more in detail.

As best seen in FIG. 2, screening bars 64 are secured to the spaced crossbars 52 and extend longitudinally of the conveyor assembly, these screening bars establishing an inclined screening plane along which the material undergoing screening travels upwardly under the impelling influence of the endless drag conveyor assembly 38. The drag conveyor assembly includes a pair of driving sprockets 66 on a transversely extending drive shaft 68, the opposite ends of which are rotatably journalled in antifriction bearings 70 which are adjustably secured as at 72 to the upper ends of the side channels 48 and 50 of the conveyor frame 46. The drag conveyor assembly 64 further includes a pair of idler sprockets 74 on a shaft 76, the opposite ends of which are rotatably journalled in antifriction bearings 78 which are secured as at 80 to the lower forward ends of the side channels 48 and 50. Two spaced apart conveyor chains 82 pass over the sprockets 66 and 74 so as to provide a lower upwardly traveling conveyor reach section which closely overlies the screening plane and a return downwardly traveling conveyor reach section which is spaced above such plane. Spaced conveyor flights in the form of impeller or pusher bars 84 extend between the two chains 82 and are designed for repeated or successive upward movement along the screening plane. Small idler gears 86 on a shaft 87 in bearings 88 maintain the upper reach section elevated above the screening plane.

The conveyor chains 82 are adapted to be driven by an internal combustion engine which is designated in its entirety by the reference numeral 90 and the component parts of which are operatively mounted on an elevated platform 92 which is supported in a horizontal position by upstanding posts 94 on the conveyor frame 46. The engine 90 is of conventional design and only the salient sub-assemblies of the engine have been illustrated in the drawings. Such sub-assemblies include an engine proper 96, a fuel supply tank 98, fuel intake instrumentalities 100, and exhaust pipe and muffler combination 102. The output shaft 104 of the engine proper 96 carries a pulley 106 which is operatively connected by a belt 108 to a larger pulley 110 (see FIGS. 1, 2 and 4). Such larger pulley is mounted on a shaft 112 which is journalled in bearings 114. The latter are supported by side plates 115 which are secured to the side channels 48 and 50. The shaft 112 also carries a sprocket 116 which is connected by a chain 118 to a larger sprocket 120 on an elevated shaft 122. The latter is journalled in bearings 124 which are mounted on side plates 126 (see FIG. 3), such side plates being in turn mounted on the side channels 48 and 50. A small sprocket 128 on the shaft 122 is connected by a chain 130 to a large sprocket 132 which is fixedly mounted on the drive shaft 68. The power train for driving the conveyor sprocket 66 from the output shaft 104 of the engine proper 96 includes the various elements or parts 106, 108, 110, 112, 116, 118, 120, 122, 128, 130 and 132. The direction of rotation of the engine output shaft 104 is such that the conveyor chain 82 will be driven in the direction indicated by the arrows in FIG. 3 to the end that the various impeller bars 84 will travel upwardly and rearwardly along the upper surfaces of the screening bars 62.

The impeller bars 84 are of a composite nature and each bar includes upper and lower angle pieces 134 and 136. The latter present horizontal flanges which are secured together as at 138 (see FIG. 7) in any suitable manner as, for example, by welding.

The upper end of the conveyor assembly 38 overlies the rear portion of the tiltable dump receptacle 40 when the latter is in its normally retracted position. This dump receptacle is in the form of an upwardly opening, generally rectangular, box-like heavy gauge sheet metal structure which is elongated in the transverse direction of the apparatus, as best seen in FIG. 2. The receptacle includes vertical side walls 140, a vertical front wall 142, a bottom wall 144, and a rear pivoted discharge gate 146. The gate 146 is pivoted as at 148 to a pair of brackets 150 which are secured to the side walls 140 adjacent to the upper forward corners thereof. The gate is designed for swinging movement about a horizontal axis and through an angle of approximately 30° so that it may move between the closed position wherein it is illustrated in FIG. 1 and the open position wherein it is illustrated in FIG. 5. The opening and closing movements of the gate 146 are automatic, which is to say that, as the dump receptacle 40 moves toward its inclined position of discharge, the gate 146 automatically moves to its open position. As the receptacle is restored to its normal horizontal position, the gate 146 is likewise restored to its closed position.

The receptacle 40 is mounted on the axletree 16 for limited tilting movements about a horizontal axis, the horizontal position of the receptacle being illustrated in FIG. 1 and the inclined discharge position thereof being shown in FIG. 5. The tilted or inclined position of the receptacle is limited by a chain 151. Accordingly, the bottom wall 144 carries two pairs of spaced apart depending lugs 152 (see FIG. 4) which receive therebetween upstanding lugs 154 on brackets 156 (see FIG. 4) which are secured to the axletree 16. The dump receptacle 40 is normally maintained in its horizontal position by a releasable pivoted latch 158 maintained on one of the supports 56 and is spring-pressed as at 160 to a normal latching position wherein it cooperates with an angle bar 161 on the front wall 142 of the receptacle. The latch 158 is capable of being manually released by means of a lever 162, the upper end of which is connected to a release cable 164 which is threaded through a bracket 166 on the side channel 50 and extends forwardly to the front end of the apparatus where it is received through an ear 168 on a post 170 and extends forwardly so that it is accessible for manipulation by the operator of the apparatus.

The post 170 also slidably receives therethrough the forward end of an elongated control rod 172 by means of which the tension of the belt 108 may be adjusted. The rear end of the rod 172 is connected to the distal end of a lever 173 which carries an idler belt-tightening pulley 174. The lever is pivoted as at 175 to a bracket 176 on the platform 92 and is spring biased as at 178 to cause the pulley 174 to release the belt 108. The control rod extends to the tractor and is convenient to the operator so that, by pulling the rod forwardly, the operator may cause the lever 173 to swing in a counterclockwise direction, as viewed in FIG. 1, thus moving the pulley 174 into engagement with the belt 108.

Automatic opening of the gate 146 is effected under the control of a linkage mechanism including two sets of linkage instrumentalities, one at each side of the dump receptacle 40. Each set of instrumentalities includes an arm 180 which is pivoted medially of its ends as at 182 to one of the side walls 140. The arm 180 is connected at its upper end to a bracket 184 on the adjacent support 56 by means of a long link 186. The arm 180 is connected at its lower end to the lower edge region of the gate 146 by a short link 188. When the dump receptacle 40 is in its retracted horizontal position, as shown in FIG. 5, the arm 180 extends substantially vertically and the link 188 draws the gate 146 shut against the normally open side of the receptacle. As the receptacle moves away from its normal horizontal position to the inclined discharge position thereof, as shown in FIG. 5, the long link 186 causes the arm 180 to tilt in a counterclockwise direction as seen in this view so that the short link 188 forces the lower edge region of the gate 146 away from the bottom wall 144 and thus opens the gate 146.

In the operation of the vehicular trailer type screening and transporting apparatus, after the trailer hitch assembly 35 has been connected to a tractor or other propelling vehicle, the frame 10 extends substantially horizontally and is disposed a slight distance above the ground. The lower forward end of the conveyor frame 46 rests upon the ground but a portion of the weight of the forward end of the frame is supported by the springs 60 so that the frame 46 lightly engages the ground and is readily capable of following any undulations which may be encountered. Assuming that the engine 90 is operating, and that the apparatus is moving or being pulled forwardly, the frame 46 functions somewhat in the manner of a scoop to pick up the material which it encounters while the pusher bars 84, which are traveling upwardly along the lower conveyor reach section, engage the material and impel the same rearwardly and upwardly along the spaced screening bars 62. These bars 62 are spaced apart a predetermined distance to the end that particles which are below a predetermined size will fall through the bars and be thus returned to the ground, while particles which are above such predetermined size will continue upwardly along the conveyor frame and will drop off the upper end of the conveyor and be received within the dump receptacle 40.

At such time as a predetermined quantity of oversized particles has been received within the dump receptacle and it is desired to unload the same at a given location, the tractor is operated to bring the apparatus to the selected location and then, by releasing the latch 158 through the medium of the release cable 164, the dump receptacle 40 will move to its inclined position as shown in FIG. 5, while the gate 146 will swing to its open position in the manner previously described. Due to the fact that the pivot point for the receptacle is located well forwardly of the vertical plane passing through the center of gravity of the receptacle, the tendency is for the receptacle, when released by the latch 158, to move toward its inclined position under the influence of gravity. Since the angle which the bottom wall 144 of the receptacle 40 assumes with respect to the horizontal is not great, the force of gravity is not relied upon entirely for discharge of the contents of the receptacle. The operator of the tractor, by driving the same rearwardly and then applying his brakes, may force the contents of the receptacle past the gate 146, utilizing the phenomena of momentum to effect the discharge. The same phenomenon may be employed to move the receptacle from its tilted position to its normal loading position.

The invention is not to be limited to the exact arrangement of parts shown in the accompanying drawings or described in this specification as various changes in the details of construction may be resorted to without departing from the spirit and scope of the invention. Therefore, only insofar as the invention has particularly been pointed out in the accompanying claims is the same to be limited.

Having thus described the invention what I claim as new and desire to secure by Letters Patent is:

1. In a portable tractor-drawn aggregate screening and transporting apparatus, in combination, a chassis including a transverse crossbar having upwardly-turned end portions, wheel spindles carried at the ends of said upwardly-turned portions, and traction wheels mounted on said spindles for tractional support on a ground surface whereby the medial region of the crossbar is supported in underslung fashion, an elongated generally rectangular chassis frame including longitudinally extending side members having their rear ends secured to and supported on the medial region of the crossbar, the forward regions of said side members being bowed outwardly away from each other to provide a relatively wide generally polygonal clearance opening, the extreme front portions of said outwardly bowed portions converging inwardly and being connected together by a tractor hitch, said side members having medial regions extending rearwardly of said outwardly bowed portions, a pair of vertically extending supports projecting upwardly from the medial regions of said side members to an appreciable height above the crossbar and said sidemembers, an elongated generally rectangular inclined conveyor frame including side frame bars, means pivotally connecting the rear end regions of said side frame bars to the upper end regions of the vertically extending supports whereby the conveyor frame is capable of limited swinging on the chassis about an elevated horizontal axis extending transversely of the chassis, said conveyor frame being inclined rearwardly and downwardly and the forward end region thereof dipping completely through said clearance opening and extending to a point closely adjacent to the ground surface, a pair of supporting brackets on the side frame bars in the forward regions thereof and overlying the outwardly bowed portions of the side members of the chassis frame, compression springs interposed between the supporting brackets and said outwardly bowed portions whereby the forward region of the conveyor frame may follow an undulatory ground surface pattern, a plurality of spaced apart screening bars substantially coextensive with the conveyor frame and establishing an inclined aggregate screening plane, an endless conveyor operatively mounted on said conveyor frame and having a lower reach section closely overlying said screening plane, a series of pusher flights on said conveyor for impelling aggregate upwardly along said screening plane, an internal combustion engine mounted on said conveyor frame and operative to drive said conveyor in a direction to cause said flights to move upwardly along the screening plane, means operatively connecting said engine and conveyor in driving relationship, a wide open-top tiltable dump receptacle mounted for tilting movement on said crossbar and having a full width pivoted discharge gate in the rear side thereof, said dump receptacle being movable between a retracted aggregate-receiving and retaining position wherein a portion thereof underlies the upper end of said screening plane and an advanced aggregate-discharge position wherein the dump receptacle is inclined for gravity discharge of aggregate, and releasable pivoted latch means for retaining said dump receptacle in its retracted position.

2. In a portable tractor-drawn aggregate screening and transporting apparatus, the combination set forth in claim 1 and including, additionally, a pair of converging deflector plates mounted on the forward ends of said side members of the chassis frame for gathering aggregate material encountered thereby and channeling the same in funnel-like fashion into register with the forward lower end of the conveyor.

References Cited by the Examiner

UNITED STATES PATENTS

| | | | |
|---|---|---|---|
| 795,321 | 7/05 | Walker | 209—240 X |
| 829,370 | 8/06 | Crawford | 56—346 |
| 946,518 | 1/10 | Rice | 209—308 |
| 1,232,284 | 7/17 | Graham | 56—346 |
| 1,315,693 | 9/19 | Wiseman | 209—420 X |
| 1,338,369 | 4/20 | Henderson | 214—509 |
| 1,344,047 | 6/20 | Le Page | 214—508 |
| 1,589,393 | 6/26 | Howe | 74—242.1 |
| 2,104,785 | 1/38 | Akeyson | 209—308 |
| 2,367,964 | 1/45 | Ross | 209—307 |
| 2,603,974 | 7/52 | Jackson | 74—242.1 |
| 2,922,510 | 1/60 | Zetterlund | 209—241 X |

FOREIGN PATENTS 604,908  2/26  France.

GEORGE D. MITCHELL, *Primary Examiner.*

HERBERT L. MARTIN, *Examiner.*